Patented Jan. 2, 1923.

1,440,621

UNITED STATES PATENT OFFICE.

CARL JACOB OECHSLIN, OF ABLON, FRANCE.

PROCESS FOR THE MANUFACTURE OF MONO AND BIS P. MONOALKYL ($CH_3$, $C_2H_5$, $C_5H_{11}$, ETC., $CH_2CO_2H$) AMINOPHENYLARSENIC ACIDS.

No Drawing.     Application filed April 2, 1921. Serial No. 458,056.

(GRANTED UNDER THE PROVISIONS OF THE ACT OF MARCH 3, 1921, 41 STAT. L., 1313.)

*To all whom it may concern:*

Be it known that I, CARL JACOB OECHSLIN, a citizen of the Swiss Confederation, residing at Ablon, in the Republic of France, have invented certain new and useful Improvements in Processes for the Manufacture of Mono and Bis p. Monoalkyl ($CH_3$, $C_2H_5$, $C_5H_{11}$, Etc., $CH_2CO_2H$) Aminophenylarsenic Acids (for which I have made application in France Oct. 9, 1913, Patent No. 473,704), of which the following is an exact and complete description.

Michaelis and Rabinerson (A. 270,141) have prepared p. dimethylamino or p. diethylaminophenylarsenic acids by the action of arsenic trichloride upon the corresponding base and by oxidation of the reaction product. It has been found that this reaction is also suitable for monoalkylated anilines in which alkyl answers to the formula: $CH_3$; $C_2H_5$; $C_5H_{11}$, etc., especially if pyridine is added to the mixture of the two substances. At the same time, with the mono-phenyl derivatives $H_2O_3As.C_6H_4.NHR$, di-phenyl derivatives $HO_2As.(C_6H_4.NHR)_2$ are obtained, in more or less large quantities, according to the temperature at which the mixture is treated. The products prepared according to this method are partly novel; for others, for instance phenylglycinarsenic acid, the process provides an easy and economical method of preparation.

*Example.*—163 gr. of amylaniline mixed with at least 79 gr. of dry pyridin, are added to 180 gr. of arsenic trichloride. The mixture is heated for one or two hours at 106–108° C. in the case of amylamidophenylarsenic acid, or to 115–120° C. in the case of bis-amylamidophenylarsenic acid. The reaction product is poured into 400 cc. of water and oxidized in an acid or alkaline solution by oxygenated water in slight excess.

The base that has not reacted is separated from the alkaline solution, and on acidifying till the reaction be very slightly acid to Congo red a mixture of mono and bis-amyl-amidophenylarsenic acids is precipitated.

In order to separate the mono-phenyl acid from the di-phenyl acid, the dry mixture is dissolved in a very little quantity of pure alcohol and ether is added. The mono-phenyl acid precipitates into a crystalline bulk; recrystallized in hot water, white flakes are obtained. It decomposes at about 172° C. without melting; it is very little soluble in water, but is soluble in alcohol, as well as in acids and alkalis. The di-phenyl acid remains in the mother liquor. It is very soluble in alcohol, insoluble in water, but soluble in acids and alkalis.

It has been possible to separate, in the same manner, the methyl- and ethylamidophenylarsenic acids, phenylglycinarsenic acid (by starting from a phenylglycine ester and by saponifying the reaction product) and the corresponding diphenyl acids.

Having now particularly described and ascertained the nature of my invention and in what manner the same is to be performed, I claim:

A process for obtaining mono- and bis-monoalkylamidophenylarsenic acids by the action of arsenic trichloride upon the corresponding base, in the presence of pyridine at 100°–120° C. and by oxidizing the reaction product.

In witness whereof I have hereunto signed my name.

CARL JACOB OECHSLIN.